Jan. 27, 1925.  
T. B. AULT  
1,524,227  
PLOW FOR BREAKING AND PULVERIZING THE SOIL  
Filed Feb. 9, 1922
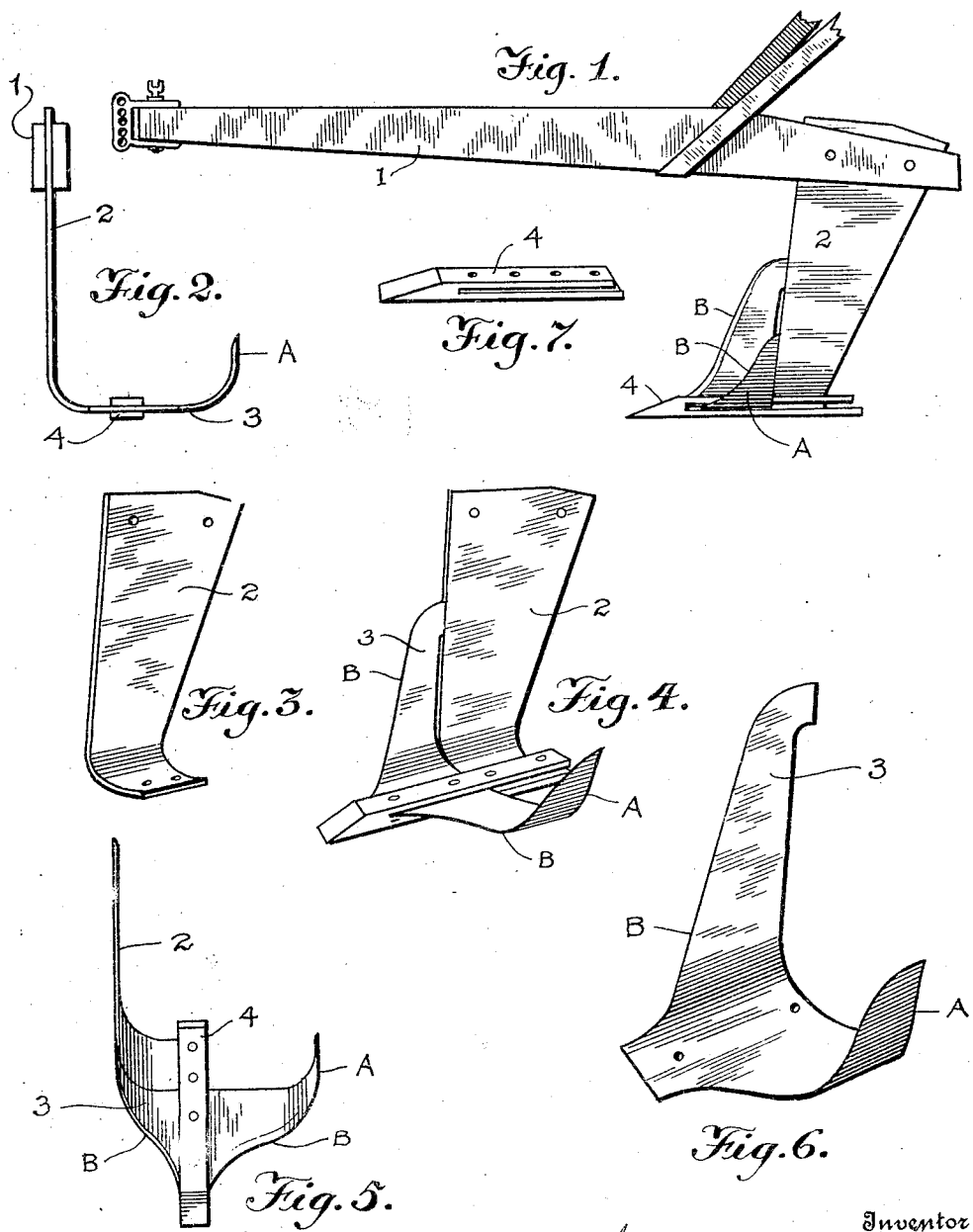

Patented Jan. 27, 1925.

1,524,227

UNITED STATES PATENT OFFICE.

THOMAS B. AULT, OF KNOXVILLE, TENNESSEE.

PLOW FOR BREAKING AND PULVERIZING THE SOIL.

Application filed February 9, 1922. Serial No. 535,409.

*To all whom it may concern:*

Be it known that I, THOMAS B. AULT, a citizen of the United States, and a resident of the city of Knoxville, in the county of Knox and the State of Tennessee, have invented a certain new and useful Improvement in Plows for Breaking and Pulverizing the Soil; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to means for breaking and pulverizing the soil, the primary object of which is the provision of a simple device for breaking and pulverizing the soil by means of a lighter draft plow than other plows, my device being so constructed with its circular bottom and U-shaped share and its sharp cutting edge in front, that it will cut its way through the soil on both sides, the pressure being no greater on one side than it is on the other, and the device being so constructed with its U-shaped share that it will cut its way through the soil on both sides, which eliminates wedging in the soil and therefore makes a lighter draft plow than other plows.

My invention does not transfer the soil to a different place as other plows do. When the U-shaped plow is drawn through the soil, the soil is slightly raised and after passing through the U-shaped plow the soil falls back in its original bed.

Further, my invention, having the circular bottom and the U-shaped share with its cutting edge in front and extending up on each side, will allow it to pass through the soil with much less friction than other plows.

Further, my invention is preferable to other plows for the following reasons: First, the draft being lighter enables deeper plowing; second, it pulverizes the soil better than other plows; third, it works on a hillside as well as on level ground; fourth, it does not leave any furrow to contend with; and fifth, it leaves the soil smooth and free from clods.

My invention is fully described in the following specification and while, in a broader aspect, it is capable of embodiment in numerous other forms, a preferred form thereof is illustrated in the accompanying drawings.

Fig. 1 is a view in side elevation of a device embodying my invention;

Fig. 2 is a view lookng directly at the front,

Fig. 3 is a perspective view of the upright standard;

Fig. 4 is a perspective view of the device shown in side elevation in Fig. 1,

Fig. 5 is a perspective view looking from beneath;

Fig. 6 is a perspective view of a U-shaped circular bottom share;

Fig. 7 is a perspective view showing the point and runner.

In the figures the numeral 1 indicates a plow beam; 2 indicates an upright standard; 3 indicates a U-shaped share with a circular bottom and sharp cutting edges (indicated by B, B) in front and extending up on each side; 4 indicates the point and runner which extends from the front to the rear of the invention; and A is a curved wing in Figs. 4 and 5 and showing the wing extending out on one side from the point and runner. The part 3, which comprises my invention, is securely riveted to 4, the plow beam is securely bolted to standard 2, and parts 3 and 4 are securely bolted to the standard 2, making the point and share easy to attach and detach.

I am aware that prior to my invention there have been plows made with similar beams, points and upright standards, therefore I do not claim such a combination broadly, but what I do claim as new and for which I desire to secure Letters Patent, is:

1. In a plow structure for breaking and pulverizing the soil, consisting of a runner and share, in combination with a beam and standard, the share extending outwardly and upwardly on one side from the runner, and extending outwardly and upwardly on the other side of the runner, and in line with the standard, the share being securely riveted to the runner, substantially as described.

2. In a plow structure for breaking and pulverizing the soil, consisting of a runner and share, the share extending out on either side from the runner, and extending upwardly on the opposite side of the runner and in line with the standard, substantially as described.

In testimony whereof I have hereunto set my hand in the presence of two subscribing witnesses.

THOMAS B. AULT.

Witnesses:
 FRANK MURPHY,
 J. F. ATCHLEY.